INVENTOR.
BENGT R. F. KJELLGREN
BY
ATTORNEY

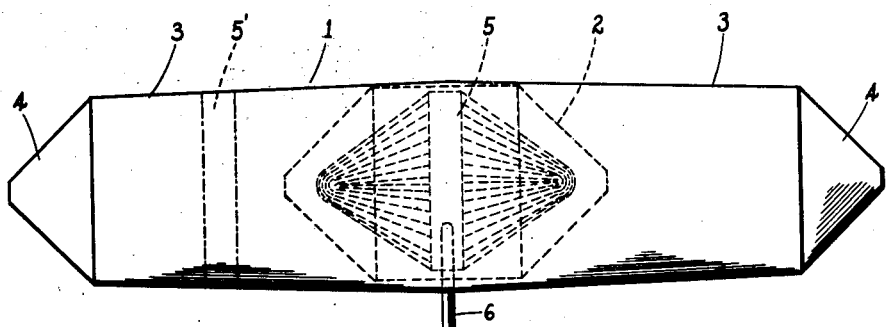
FIG. 1
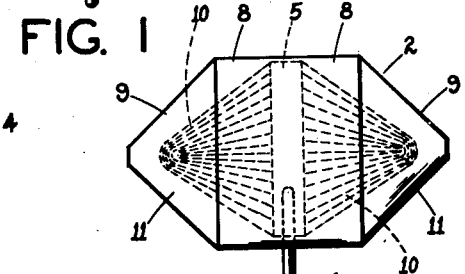
FIG. 2   FIG. 3
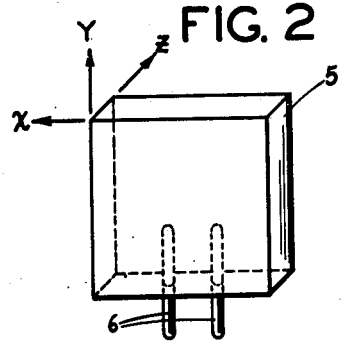
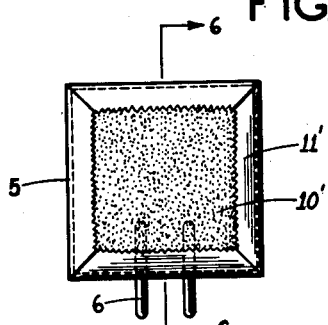
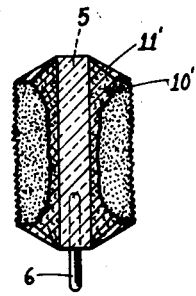
FIG. 4   FIG. 5   FIG. 6
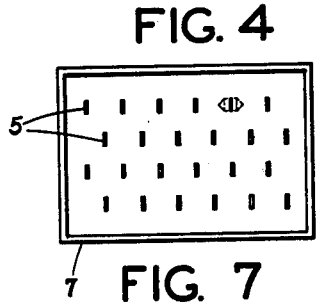
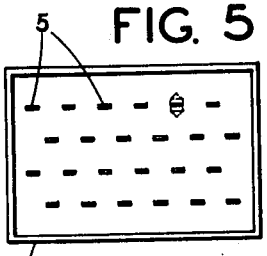
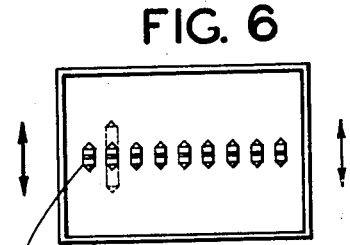
FIG. 7   FIG. 8   FIG. 9
INVENTOR.
BENGT R.F. KJELLGREN
BY
ATTORNEY May 3, 1949.  B. R. F. KJELLGREN  2,468,761
METHOD OF GROWING P-TYPE SEED CRYSTALS
Filed July 5, 1946  2 Sheets-Sheet 2

Patented May 3, 1949

2,468,761

UNITED STATES PATENT OFFICE 2,468,761

METHOD OF GROWING P-TYPE SEED CRYSTALS

Bengt R. F. Kjellgren, University Heights, Ohio, assignor to The Brush Development Company, Cleveland, Ohio, a corporation of Ohio Application July 5, 1946, Serial No. 681,505

9 Claims. (Cl. 171—327)

1

The invention relates to a method of growing seed crystals from artificially formed crystalline seed bodies, the method being particularly applicable to crystals of the P-type group consisting of primary ammonium phosphate (NH₄H₂PO₄) and all other crystalline materials isomorphic with it.

Prior to the present invention the method believed to be most satisfactory for the growing of P-type crystals involved the provision of seed plates cut from crystals of the material to be crystallized with the faces of the plates perpendicular to the Z axis of the crystal; planting the seed bodies in a solution of the said material; causing a flow of the solution relative to the seed bodies parallel to the Z axis thereof and meanwhile lowering the temperature of the solution until growth of the seed bodies to the typical crystal form of the material in solution was effected; picking the seed crystals grown in this manner; segregating such of them as were unsound and uncertain on further growth of producing sound economically useful crystals; then replanting the remaining sound seed crystals in another solution of the material to be crystallized and again effecting flow of the solution parallel to the Z axis while lowering the temperature of the solution for continued growth of the crystals to desired size.

This stated prior practice marked a notable advance on the still earlier practice in which the large bar crystals were grown in one continuous stage. However, in the dual stage method the gain in efficiency over the earlier practice lay largely in the second stage in which the seed crystals, after the replanting, were grown to large bar size; and the extremely low efficiency which marked the growth of the cut seed plates into seed crystal form (occurring during the first stage of the method) was not overcome or improved, although the first stage production capacity of given plant facilities was increased because of the planting of a large number of seed bodies in a solution tray of given size.

It has been the chief object of the present invention to provide a method of growing P-type seed crystals from cut seed bodies or elements capable of effecting such growth more rapidly and with much lower losses due to unsound growth.

With the stated object in view the invention utilizes certain expedients based upon the discovery that the transformation of the above described artificial seed plate of simple form to the more complex crystal form of the P-type crystals may be radically affected by change of the direc-

2 tion of the solution flow in relation to the Z axis of the crystalline seed plate during the cooling to effect growth and also by the introduction of certain addition substances into the salt solution in which the growth is carried out.

In order that the invention and suitable procedure in carrying it out may be fully understood its application to the growth of seed crystals of primary ammonium phosphate will now be described, with reference to the accompanying drawings.

In the drawings,

Fig. 1 is a side elevation of a primary ammonium phosphate crystal as grown by the present method.

Fig. 2 is an end elevation of the crystal shown in Fig. 1.

Fig. 3 is a side elevation of a seed crystal suitable for use in growing the elongated bar crystal shown in Fig. 1.

Fig. 4 is an isometric view of an artificially formed crystal seed body in the form of a square plate used to start the growth of a seed crystal such as shown in Fig. 3.

Fig. 5 is an end elevation of the seed crystal shown in Fig. 3 in an intermediate stage of the latter's growth.

Fig. 6 is a section on the line 6—6 of Fig. 5.

Fig. 7 is a diagrammatic plan view on a greatly reduced scale of a crystal-growing tray or container planted, in accordance with the present invention, with seed plates such as are shown in Fig. 4.

Fig. 8 is a similar view of a tray planted with seed plates in the manner employed in prior practice.

Fig. 9 is a similar view showing the manner in which seed crystals, produced by either the present method or the prior practice, may be planted for the growth of full size bar crystals such as that shown in Fig. 1.

Figure 10:
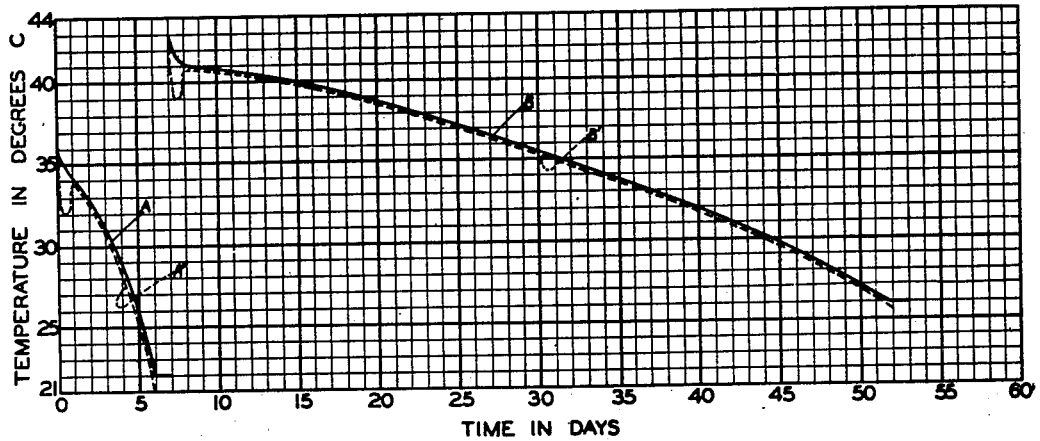
Fig. 10 is a crystal-growing chart showing the temperature control of the salt solution throughout the dual stages period of growth in accordance with the present invention.

To facilitate explanation and understanding of the invention a fully grown crystal has been shown in Fig. 1 and is designated as an entirety by the numeral 1. The crystal consists of a seed crystal 2, elongated prism sections 3, 3 and pyramidal end sections 4, 4. In the production of a crystal such as shown in Fig. 1 by the present method, an artificial seed plate 5 (Fig. 4) is severed, as by cutting with a saw, from a previously grown crystal (as at 5' in Fig. 1) with the orientation indicated in Fig. 4 by the crystal axis arrows X, Y, Z representing the conventional orthogonal system of axes X, Y, Z with the Z axis parallel to the longitudinal symmetry axis and also the optic axis of the P-type crystalline material. As is indicated in Fig. 4, the major faces of the plate 5 are at right angles to the Z axis. Holes are drilled in one of the narrower faces of plate 5 to permit attachment of supporting pins 6, which may have their projecting ends inserted in holes in a support attached to the bottom of the tray in which the crystal is to be grown. In practice the tray is planted with a plurality of such seed plates and is mounted to be tipped or rocked back and forth on a fixed axis to cause a back-and-forth flow of solution relative to the seed plates as disclosed in my Patent Reissue No. 19,697.

As shown in Fig. 7 of the drawings a solution tray 7 is planted with 24 of the plates 5 and it will be noted that the plates are disposed in relation to the pivotal axis of the tray so that the back-and-forth solution flow indicated by the arrows at the right of the tray will be parallel to the major faces of the plates, or at right angles to the Z axis of the crystalline material. This arrangement of the seed plates in relation to the solution flow differs from the prior practice, is responsible for important results peculiar to the present method and will be more fully discussed at a later point in the description.

The seed plates having been arranged as specified in the tray, the latter is filled to a suitable level with a hot water solution of the primary ammonium phosphate salt containing in addition to the salt suitable addition substance or substances, preferably iron or iron and ammonium sulphate $(NH_4)_2SO_4$. The solution can be prepared by dissolving primary ammonium phosphate in hot distilled water in amount such that the solution will be saturated at a temperature that will be suitable for starting the crystal growth so that the growth to the seed crystal stage effected by gradual lowering of the solution temperature will be reached when the temperature has been lowered about to normal room temperature. A saturation temperature of about 36° C. is suitable. The iron addition should amount preferably to .06 to .12 grams per liter of solution. Larger amounts can be used but without added advantage. An addition of .10 grams per liter either alone or combined with 7 grams per liter of ammonium sulphate has been found satisfactory. From about 4 to 10 grams per liter of ammonium sulphate can be used but 7 grams per liter or somewhat less is to be preferred to avoid unnecessary contamination of the solution. The iron can suitably be introduced by dissolving iron filings in phosphoric acid and water and adding the resulting solution to the salt solution until the latter contains the desired amount of iron per liter. The ammonium sulphate can, of course, be added directly to the salt solution. Preferably, both the iron and the ammonium sulphate additions are used.

After the introduction of the addition agent or agents into the salt solution the acidity of the latter is checked and its pH adjusted (if necessary) to a value within the range of about 3.9 to 4.1. A lower pH value can also be used but the upper limit is more critical because the iron addition has an increasing tendency to precipitate ferric phosphate as the pH value is increased.

The solution, prepared as above described, is preferably heated two or three degrees above the saturation temperature, say to 38° C., and at the higher temperature is poured into the prepared tray preheated to receive it. The tray is thereupon tightly covered to exclude dust and prevent evaporation of the solution. The effect of the hot solution is to dissolve a little of the superficial material of the planted seed plates so that the growth to be carried out may be started on fresh, clean surfaces and with the solution free from potential centers of spurious crystallization.

Suitable automatic temperature control of the solution to effect the crystal growth may be had by housing the trays in air-conditioned chamber and varying the temperature of the air circulated through the chamber.

In Fig. 10 of the drawings the curve A represents a temperature control suitable for the growth of 24 seed crystals of 1.5" x 1.5" cross-sectional size and is produced by plotting temperature of the solution and time in days as vertical and horizontal coordinates, respectively. Curve A' represents corresponding air temperatures, which naturally differ somewhat from the solution temperature. Starting with the air at a temperature of 38° C. its temperature is dropped rapidly for several hours to reduce the superheated solution to its saturation temperature and then raised somewhat to a temperature a little below the solution temperature. Thereafter on the second and succeeding days the air temperature is lowered progressively to effect the gradual lowering of the solution temperature, the differential between the solution and air temperatures depending on the volume of solution, rate of temperature reduction, insulation of the chamber walls, etc. Meanwhile the solution is rocked back and forth to facilitate the crystal growth. By gradually lowering the temperature of the solution as indicated by curve A in Fig. 10 while rocking the tray as described crystalline growth to produce seed crystals 2 in accordance with the primary ammonium phosphate crystal habit can be completed and the crystal crop picked, all in a seven days period. Of this period the first day may be consumed in planting the seed plates and adjusting the temperature of the solution to the predetermined value corresponding to saturation. The next five days may be consumed in cooling to effect crystallization and the seventh day in picking the seed crystals and preparing another solution for the next crystallization of seed crystals.

The growth effecting the development of the seed crystal 2 from plate 5 is peculiar in its nature. It will be noted in Fig. 3 that the seed crystal is made up of the seed plate 5, short prism sections 8, 8 and pyramidal end sections 9, 9. The crystalline growth which produces the seed crystal, in accordance with the P-type crystal habit, is very much less laterally, i. e., in the directions of the X and Y axes, than in the direction of the Z axis. This is clearly indicated in Fig. 3. The growth in the direction parallel to the Z axis, building up on the major faces of the seed plate 5, tends to be unsound or mushy (as indicated at 10) except near the peripheries of the seed plate. In these peripheral regions, as at 11, 11 in Fig. 3, the growth is clear and sound; and under the influence of the specified back-and-forth flow of the solution this sound growth develops inwardly toward the longitudinal axis of the crystal and, under optimum conditions, forms a solid crystal shell of pyramidal shape as indicated in the drawings.

An ancillary object of the present invention is to provide more nearly "optimum conditions" for the development of the seed crystal from the plate-shaped seed body. Figs. 5 and 6 of the drawings show an intermediate stage in the growth of the seed crystal. It will be noted that the peripheral section 11 as shown in Fig. 3 is only partially developed at 11' in Fig. 6 and that the unsound growth at 10' presents a concavity, which is later filled in as the growth continues, as is apparent from Fig. 3. The arrangement of the crystal plates 5 as shown in Fig. 7 appears to be peculiarly favorable to the development of the growth toward the formation of the sound shell structure shown in Fig. 3. Apparently the back-and-forth flow of the solution at right angles to the Z axis impinges on the surfaces of the shell growth 11' in a manner favoring the building up of that section of the growing body, with a minimum of destructive action upon the growth 10'. In any event the result is that, as compared with prior practice, a much larger proportion of the seed plates develop into sound seed crystals such as that shown in Fig. 3 and the growth is effected in a shorter time. Comparative tests of the method with and without the addition of iron or of both iron and ammonium sulphate, have shown that both the orientation of the seed plates in relation to the flow and the addition agents contribute to both of the two kinds of improvement but that the major part of the shortening of the growth time is due to, or in some way dependent upon, the specified orientation of the plates and that the major part of the improvement in the quality of the crystalline growth is due to the addition agent or agents. In some manner the addition agents serve to condition the solution to permit a higher degree of supersaturation therein without danger of starting spurious crystallization.

Those crystals which do not complete a sound pyramidal shell growth in the five days cooling period are uncertain of doing so if the growth were continued. Accordingly at the end of the five days growth the crystals are picked from the tray, inspected and sorted to eliminate those judged uncertain of developing a sound growth structure. In this sorting of the P-type crystals three grades are recognized, namely, the first grade which includes those which have formed sound pyramidal shells at both ends of the crystal, the second grade which have formed such sound shell growth only at one end of the crystal and the third grade which includes the remaining crystals which have failed to form a sound growth at either end.

Such of the seed crystals 2, produced in the manner described, as are suitable for further growth may be replanted in accordance with prior practice. Such replanting is shown in Fig. 9 where a tray 12 is planted with 9 seed crystals with spacing suitable to permit full growth of the crystals to desired size and to suitably accommodate back-and-forth flow of the solution. However, in this planting it will be seen that the crystals are planted with their Z axes parallel to the direction of the back-and-forth flow of the solution which is indicated by the arrows at the right of the tray 12. This arrangement of the crystals was early found, in the prior practice, to favor the desired lengthwise growth of the crystals following the closing of the pyramidal shells. Starting with a suitable hot distilled water solution of primary ammonium phosphate in the tray 12, a second growing stage is carried out by gradually lowering the temperature of the solution while rocking the tray to effect growth of the elongated crystals to the stage shown in Fig. 1, and by dotted lines in Fig. 9 in the case of one of the crystals. The temperatures of the solution and the air in the second growth stage are represented in Fig. 10 by curves B and B', respectively. Since a greater growth is required to produce the elongated full size crystals such as shown in Fig. 1 than is required for the production of seed crystals 2 the growth in tray 12 is started with a saturated solution at correspondingly higher solution temperature such as 41° C. and this is gradually lowered from day to day as indicated by curve B so that temperature of the solution will not fall enough to require excessive refrigeration.

Figure 11:
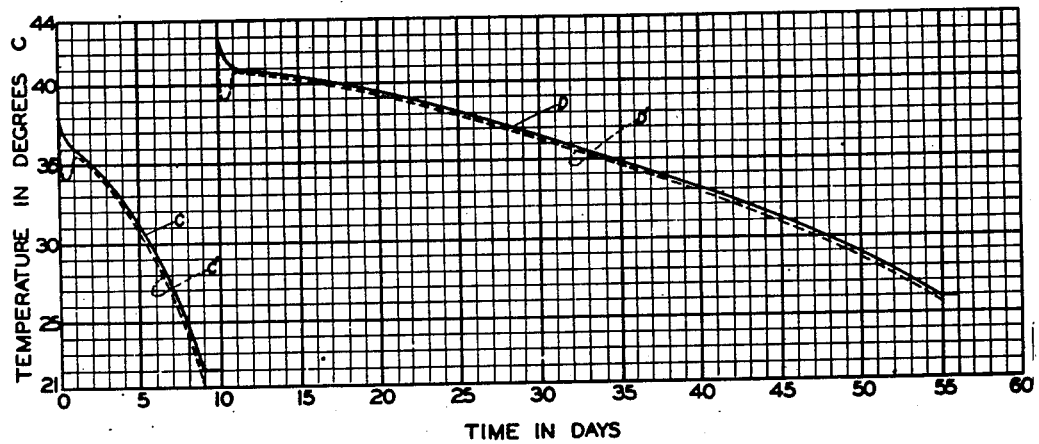
Fig. 11 is a similar chart representing a prior practice.

The significance of the results secured by the present method are indicated by specific comparison with the procedure of the prior two-stage practice. In the prior practice in the case of P-type crystals the seed plates 5 were planted in a pure water solution of primary ammonium phosphate in the manner indicated in Fig. 8 of the drawings where the tray 13 is planted with 24 seed plates disposed with their crystal Z axes parallel to the back-and-forth flow indicated by the arrows at the right of the tray. With this planting the procedure was of substantially the same character as has been described for the present method except that the cooling to effect growth of the seed crystals required about eight days instead of five days (or less) for the present method. The temperature control of the prior practice is represented in Fig. 11 where curves C and C' represent the growth of the seed plates to crystal form and curves D, D' represent the second stage growth of the seed crystals to the bar crystal form shown in Fig. 1 of the drawings. As in the case of Fig. 10 the full line curves represent solution temperatures and the dashed line curves represent air temperatures. On comparing the curves of Fig. 10 with those of Fig. 11 it will be observed that the only significant difference is the shortening of the cooling period in the growth of the seed crystals from 8 days to 5 days or less, this saving being made possible by the more favorable growing conditions secured by the arrangement of the seed plates relative to the solution flow and the addition agent employed. A further and more important gain secured by the present method is not indicated by the growth curves, namely, the very great increase in the number of sound seed crystals, particularly first grade crystals, which are produced by the new method.

Under the prior practice as applied to the growth of primary ammonium phosphate crystals, on the average about 2% of the seed crystals were of the first grade and about 8% of second grade. As the second grade crystals have only one end sound the sound material realized from the first and second grades totalled about 6%. In other words, in the prior practice, represented by the planting of Fig. 8 and the growing curve C of Fig. 11, about 94% of the entire crystal growth and corresponding proportions of the crystal-growing plant and of the labor incident to the growth were wholly wasted in the production of the seed crystals. In the second stage growth of the prior practice using first grade and second grade seed crystals a second stage crop of useable crystalline material was secured amounting to 60% of the maximum that might be secured starting with all seed crystals perfectly formed, i. e. of the first grade. Thus with a first stage efficiency of 10% and a second stage efficiency of 60% the prior practice realized an overall efficiency of only 6%.

In comparison with that result the present method in its preferred form above described has been found to produce about 91% first grade seed crystals and about 7% second grade crystals or a total of about 94.5% of sound crystalline growth as compared with 6% of sound crystalline growth realized in the prior practice, or a gain of 88.5%. Hence the overall efficiency in the growth of P-type bar crystals by the present method, with 94.5% for the first stage and 60% for the second stage is about 56.7% as compared with 6% for the prior practice. If the specified orientation of the seed plates relative to solution flow is used without the addition agents the growing time of the preferred practice is not much affected but the proportion of first and second grade seed crystals is substantially lower, namely, about 9% of first grade and 37% of second grade. If the iron and ammonium sulphate additions are used with the seed plate arrangement of the prior practice the yield is reduced to about 19% first grade and 50% second grade seed crystals and nearly eight days net growing period is required.

The use of iron alone as addition agent gives good results but not as good as for iron and ammonium sulphate together. Using iron alone and the present method arrangement of the plates a yield of about 42.5% first grade seed crystals and about 44.5% of second grade seed crystals has been realized within the five days growing period; which is about 65% of sound crystalline growth. Using the iron addition with the seed plate arrangement of the prior practice a yield has been realized of about 3% first grade and 15% second grade crystals, but with a growing period of nearly eight days. This is a substantial improvement over the prior practice but far below the improvement secured by the combined use of the new seed plate planting and the iron addition agent.

From what has been said above it will be seen that each of the two expedients of the present method can be used alone with marked improvement in yield as compared with the prior practice but that the preferred combining of the two expedients gives results far above the mere additive effects of the single expedients.

The advantages arising from the present invention can be more fully seen by considering the reduction in size of plant and in equipment for a given production (or alternatively the increase in production of a given plant) which the invention makes possible. Under the above described dual stage prior practice a plant with 100 solution trays of the capacity shown in the drawings, using part of the trays for growing seed crystals, 24 to the tray, and the remainder for growing bar crystals, 9 to the tray, would produce 10% of 24 seed crystals per tray in 10 days or 2.4 crystals per tray per day, or 10.8 seed crystals per tray in the 45 days of the bar crystal growth period (Fig. 11). At this rate 46 trays will produce 497 seed crystals per 45 days as compared with 9 x 54 or 486 full size bars which can be grown in the remaining 54 trays in the same period.

With the preferred form of the present method each tray planted with 24 seed plates produces 91+7=98% of 24 or 23.5 first and second grade seed crystals in 7 days or 3.35 crystals per tray per day or approximately 151 seed crystals in the 45 days of the bar crystal growth period. At this rate 6 trays will produce 906 seed crystals per 45 days as compared with 9 x 94 or 846 full size bars which can meanwhile be grown in the remaining 94 trays in the same period. This yield of 846 full size crystals is to be compared with the yield of 486 crystals in the prior practice. However, this comparison does not fully indicate the increase in plant production capacity secured with the present method since in the prior practice the 486 crystals were 20% first grade and 80% second grade so that the amount of solid useable crystalline material was measured by 486 x .60 or 291.6; whereas with the present method the 846 large crystals produced are $91\frac{6}{98}$ or 92.8% first grade and 7.2% second grade crystals so that the amount of solid useable crystalline material is measured by 846 x 96.4 or 805.5. This, compared with 291.6 under the prior practice, represents an increase in plant production capacity of more than 175%.

It is to be understood that the specific procedures which have been described are presented for purposes of explanation and illustration, not limitation, and that various equivalent procedures may be followed within the bounds of the invention as claimed.

What is claimed is:

1. The method of growing seed crystals of a P-type substance which comprises the steps of providing artificial seed bodies severed from crystal growth of the said substance and having major faces extending transversely of the Z axis of the crystal growth; planting the seed bodies in a solution of the said substance conditioned to permit supersaturation of the solution to a higher degree without starting spurious crystallization than is possible without such conditioning; and causing a flow of the solution relative to the seed bodies in a direction about perpendicular to the Z axis of the seed bodies while progressively lowering the temperature of the solution until growth of at least some of the seed bodies to a superficially sound crystal form typical of the said P-type substance is effected.

2. A method of growing P-type seed crystals as claimed in claim 1 in which the specified major faces of the seed bodies are at right angles to the Z axis of the bodies.

3. A method of growing seed crystals as claimed in claim 1 in which the solution of the P-type substance is conditioned by the presence therein of iron and ammonium sulphate additions.

4. A method of growing seed crystals as claimed in claim 1 in which the P-type substance is primary ammonium phosphate and the solution thereof is conditioned by the presence therein of iron and ammonium sulphate additions.

5. A method of growing seed crystals as claimed in claim 1 in which the solution of P-type substance is conditioned by the presence therein of iron.

6. A method of growing seed crystals as claimed in claim 1 in which the P-type substance is primary ammonium phosphate and the solution thereof is conditioned by the presence therein of iron.

7. In a method of growing seed crystals of a P-type substance the steps of providing artificial seed bodies severed from crystal growth of the said substance and having major faces extending transversely of the Z axis of the crystal growth; planting the seed bodies in a solution of the said substance; and causing a flow of the solution relative to the seed bodies in a direction about perpendicular to the Z axis of the seed bodies.

8. In a method of growing seed crystals of a P-type substance the steps of providing artificial seed bodies severed from crystal growth of the said substance and having major faces extending transversely of the Z axis of the crystal growth; planting the seed bodies in a solution of the said substance conditioned by the presence therein of iron and ammonium sulphate; and causing crystal growth of the seed bodies.

9. A method of growing seed crystals as claimed in claim 7 in which the P-type substance is primary ammonium phosphate.

BENGT R. F. KJELLGREN.

REFERENCES CITED

The following references are of record in the file of this patent:

UNITED STATES PATENTS

| Number | Name | Date |
|---|---|---|
| 2,424,273 | Haas, Jr. | July 22, 1947 |